(12) United States Patent
Roberts

(10) Patent No.: US 7,347,653 B1
(45) Date of Patent: Mar. 25, 2008

(54) MOTORCYCLE TRANSPORT APPARATUS

(76) Inventor: Franklin Roberts, 8588 Coffey Rd., Austin, CO (US) 81401

( * ) Notice: Subject to any disclaimer, the term of this patent is extended or adjusted under 35 U.S.C. 154(b) by 110 days.

(21) Appl. No.: 11/374,265

(22) Filed: Mar. 13, 2006

Related U.S. Application Data

(60) Provisional application No. 60/661,374, filed on Mar. 12, 2005.

(51) Int. Cl.
*B60P 7/08* (2006.01)
(52) U.S. Cl. .................................. 410/3; 410/7; 410/8
(58) Field of Classification Search .................. 410/2, 410/3, 7–9, 12, 19, 22, 30, 77, 80; 224/403, 224/501, 510, 536, 323, 552, 42.38, 554, 224/570, 924; 248/503
See application file for complete search history.

(56) References Cited

U.S. PATENT DOCUMENTS 6,902,363 B2 * 6/2005 Couto .......................... 410/3
6,966,732 B2 11/2005 Gohata \* cited by examiner

*Primary Examiner*—Stephen Gordon
(74) *Attorney, Agent, or Firm*—Crossley Patent Law; Mark Ashley Crossley

(57) ABSTRACT

A motorcycle transport apparatus to secure a motorcycle or recreational vehicle during transport is provided. The apparatus is comprises a base assembly attached to a truck or trailer bed and a clamp assembly to fasten the lower frame of a motorcycle to the base assembly. The base assembly comprises spring loaded latch and lock levers, which may be easily operated by one person, to latch and release the clamp assembly from the base assembly without marring the motorcycle's paint or interfering with the motorcycle's wires, brake lines, or engine.

2 Claims, 9 Drawing Sheets

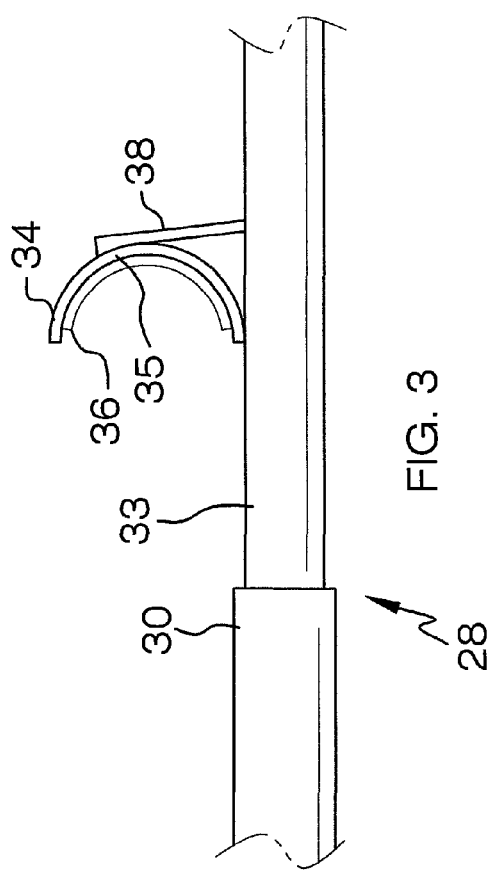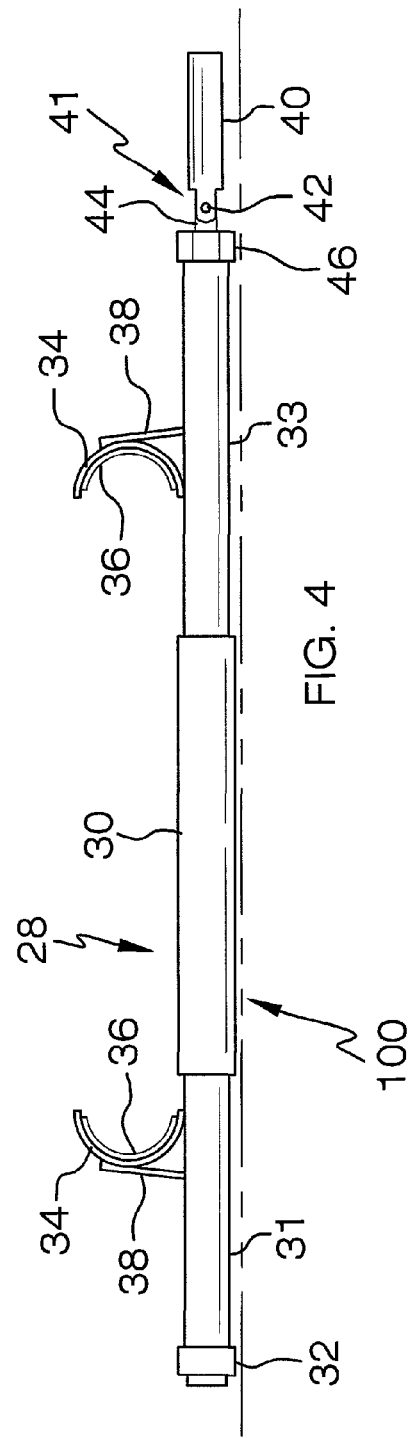

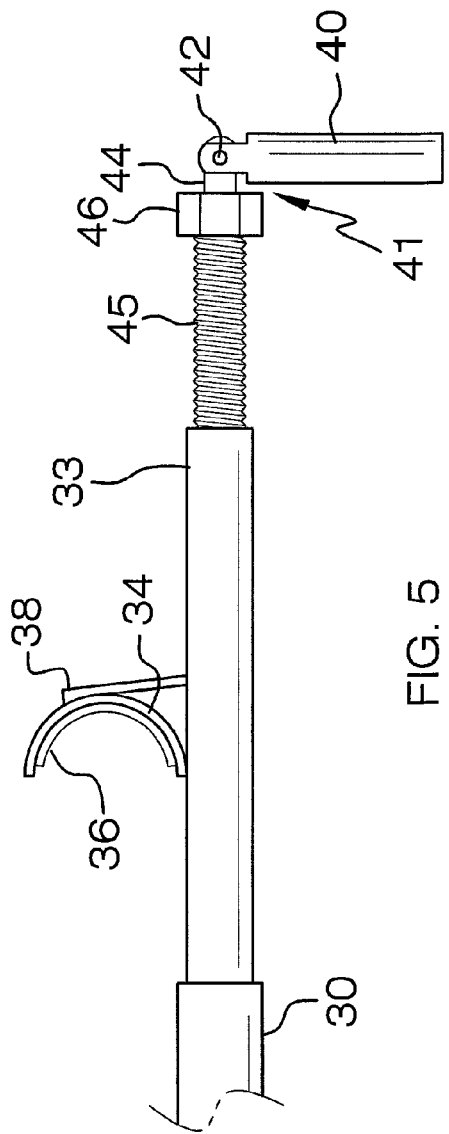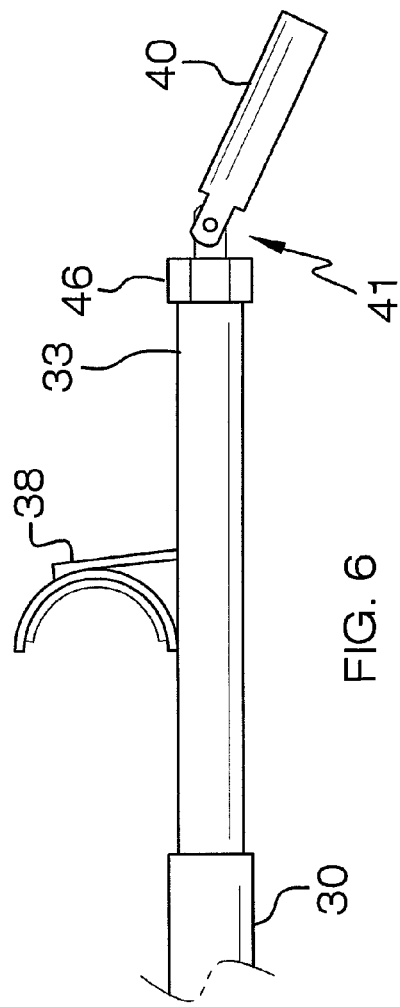
FIG. 5
FIG. 6

MOTORCYCLE TRANSPORT APPARATUS

BACKGROUND OF THE INVENTION

Many devices are present in the art for securing a motorcycle during transport and storage. For example, flexible tie down straps have been used for many years. Typically, such straps require attachment to a motorcycle at four locations. The common practice with the straps is to compress the suspension at one end of the motorcycle, secure a strap on either side of the motorcycle, then repeat the process at the other end of the motorcycle. The ends of the straps opposite those attached to the motorcycle must be secured to some part of the object to which the motorcycle is temporarily attached. The drawbacks to such straps are numerous, including the tendency to loosen during transport, difficulty in locating a proper securing point on the motorcycle itself, difficulties in locating proximal securing points for the ends of the straps opposite those attached to the motorcycle, and, often, undesirable compression of or stress on the motorcycle's suspension.

Other devices exist which are firmly secured to various parts of a motorcycle, such as to the handlebars or the forks. Many devices temporarily engage either side of a tire or wheel in a track-like arrangement. All of these devices have shortcomings. Shortcomings include potential marring of the motorcycle, rubbing of tires and wheels, and cumbersome and space-consuming designs. Additionally, releasing the motorcycle is often quite difficult, and without assistance, the motorcycle may fall over. A motorcycle transport apparatus that addresses the above disadvantages is needed. A motorcycle transport apparatus that can be quickly engaged and disengaged to easily free a motorcycle and that can be easily operated by one person is needed. A motorcycle transport apparatus, which allows one person to easily mount and dismount the motorcycle from its secured position, is needed. The present apparatus offers the improvements to address these needs.

SUMMARY OF THE INVENTION

The general purpose of the present invention, described subsequently in greater detail, is to provide a motorcycle transport apparatus which is not anticipated, rendered obvious, suggested, or even implied by prior art, either alone or in combination thereof.

To attain this, the present motorcycle transport apparatus is a mechanical device designed to secure a motorcycle while in transit. The motorcycle transport apparatus comprises a rubber-lined clamp which fastens to the lower frame tubes of a motorcycle. Said clamp does not permanently attach to the cycle. The present motorcycle transport apparatus will accommodate tubes from 1⅛" to 1½" in diameter, frame widths from 10" to 14½" for standard bars and 4½" to 7½" for a Sporster bar. One size clamping bar is designed to fit most Harley Davidson models and a clamping bar of another size design will fit a Sporster model. The present apparatus fits many other motorcycle brands.

The present motorcycle transport apparatus basically comprises a base assembly and a clamp assembly. Said base assembly is generally a parallelepiped. Said base assembly is secured generally with bolts and two mounting plates with nuts to a surface, such as a trailer floor, truck bed, or garage floor. Said mounting plates are secured on an opposite side of a truck bed, for example, to which the base assembly is to be fastened. Holes in the truck bed, for example, are aligned with holes in the base assembly. The bolts are passed through the holes, then into the nuts of the mounting plates to secure the base assembly to the truck bed. The base assembly comprises bracketry designed to receive the clamp assembly. This bracketry generally includes two spaced apart uprights. A side plate is adjustably affixed to each upright with adjustment holes, which provides for a universal fit to many motorcycles and recreational vehicles. The side plates are adjusted with bolts and nuts. Each side plate is further comprised of a plate slot. Each side plate is further fitted to a latch lever with bolts. Each latch lever pivots in a plane equal to that of the vertical side plate. Each latch lever is further comprised of a lever channel. Each lever channel further comprises a channel ear. A spring acts to pull the lever channel and hence lever ear into a downward position until the latch lever is released as desired. A lock lever arm selectively secures the latch lever in an open or closed position to release or secure a motorcycle frame. A spring acts on the lock lever arm to retain the arm as desired.

The clamp assembly removably affixes to a motorcycle or recreational vehicle frame. The clamp assembly is cushioned at its point of vehicle contact by a rubberized surface to prevent marring of the motorcycle or recreational vehicle. The clamp assembly is partially comprised of an outer tube. Within the outer tube, entering one end of the tube, is an adjustable clamp bar. The adjustable clamp bar slides freely within the outer tube. The outer end of the adjustable clamp bar is abutted by the threaded rod, which fits within the clamp bar. The threads on the threaded rod engage the threads within the outer tube. The threaded bar is fitted with a pivoting handle. Turning the handle of the threaded bar thereby moves the clamp bar inwardly and outwardly within the outer tube. The clamp bar is thereby removably secured to the lower frame members of the vehicle. Proximal to one end of the outer tube, the end opposite the entry of the clamp bar, is a C-clamp. A matching C-clamp is fitted to the clamp bar. Each interior of the respective C-clamps is fitted against the lower frame of the vehicle to be secured. Turning the handle of the threaded bar then reduces the distance between the C-clamps, thereby securing the clamp bar to the frame of the vehicle.

Operation of the present motorcycle transport apparatus is simple. With a clamp bar secured to a motorcycle's frame, one drives a motorcycle into the mounted base assembly. The clamp assembly fits within the base. A downward foot press of each foot of the rider releases the lock lever to firmly latch the motorcycle in place. Springs hold the assemblies firmly locked together. If the adjustable clap bar will not clear the ramp, a user must install the adjustable clamp bar onto the motorcycle after entering the truck bed or trailer bed. Also, if one side of the clamp assembly doe not automatically latch, a user may kick the unsecured side with his foot to latch the motorcycle frame in place. After both sides of the clamp assembly are latched and locked, a user tightens said adjustable bar clamp by hand only, never using tools to further tighten it.

A downward foot press of each foot of the rider also releases the clamp assembly from the base to remove a motorcycle from its secured position. When a user pushes his foot on each latch, the motorcycle will move back about ¼". If the truck or trailer is on a hill or incline, the motorcycle could potentially roll from the base and fall. To present this from occurring, a rider should engage the motorcycle transmission into low gear, allowing the motorcycle to roll back enough to unlatch the locks. After releasing the latches, a rider must hold the hand brakes while getting onto the motorcycle so that the motorcycle does not roll from the base. The base will hold the motorcycle upright until it is moved back another inch. Then the motorcycle is backed off of the truck bed or trailer bed, the rider lowers the kickstand, and removes the adjustable clamp bar from the motorcycle. The motorcycle is then ready to ride.

One of method of using my motorcycle transport apparatus generally comprises the following steps:

The user first mounts the bracket to a motorcycle. This action generally comprises by performing the following steps:

A. Detaching donut clamps from a holding plate.
B. Unscrewing alien pins holding donut clamps together.
C. Attaching clamps to down tubes on motorcycle frame with screw holes facing away from the motor. A user is cautioned not to tighten such clamps all the way at this point.
D. Attaching holding plate loosely to donut clamps with enclosed bolts and do not tighten all the way at this point.
E. Determining the location of the base station by placing a motorcycle in a trailer and aligning the holding plate that has been attached to down tubes, to eyeholes on base station and inserting a slider rod.

Now a user knows the correct place for the donut clamps to correctly align the holding plate with the base station. This also gives a user the correct position for the base station to be attached to the trailer bed.

F. Marking the holes.
G. Detaching the holding plate from donut clamps and tightening said donut clamps securely to the frame at the marked position. The donut clamps may be left on the down tubes permanently if desired.

Next, a user mounts the base plate by performing the following steps:

A. Drilling holes, using a ½ inch drill bit, having already determined the location of the base plate.
B. Placing the base station on the bed of the trailer and support bar under the bed. Attaching said base plate and support bar using a 2"×½" grade 8 bolts, lock washers and nuts.

Then, a user attaches the motorcycle to my motorcycle transport apparatus by performing the following steps:

A. When the base station and donut clamps are securely mounted, driving a motorcycle over the base station, driving the motorcycle onto the base station as straight as possible, attaching a holding plate to donut clamps, and aligning base plate eyeholes and holding clamp eyeholes.
B. Inserting bar through eyeholes and securing the bar by placing a cotter pin or padlock in the hole at the end of the bar. One way to perform this step, is to have the driver remain on the motorcycle, while an assisting person slides the bar through the eyeholes.

To unload a motorcycle from my motorcycle transport apparatus, a user performs the following steps:

A. Removing the locking pin and sliding bar back through the eyeholes.
B. Backing the motorcycle off the motorcycle transport apparatus.
C. Removing the holding plate before moving the motorcycle off the trailer. The user should always remove the holding plate from the motorcycle before riding the motorcycle.

In the event the user encounters difficulties such as when the eyeholes do not line up perfectly, the user should check to ensure that the motorcycle is lined up straight on the base station. If the motorcycle is not lined up straight, it may be straightened by turning the motorcycle handlebars either right or left. By doing this, the user moves the eyeholes horizontally. To move the eyeholes vertically, the user should lean the motorcycle either to the left or right. In addition, if the bar is tight and will not slide when trying to unload a motorcycle, the motorcycle is not positioned straight on the base station. One way to correct this situation is, while an assistant pull on the bar, turning the motorcycle handlebars either right or left to move the eyeholes horizontally or leaning the motorcycle either to the left or the right to move the eyeholes vertically.

Thus has been broadly outlined the more important features of the improved motorcycle transport apparatus so that the detailed description thereof that follows may be better understood and in order that the present contribution to the art may be better appreciated.

An object of the motorcycle transport apparatus is to secure a motorcycle in transit without marring the motorcycle or scratching a motorcycle's paint or chrome.

Another object of the present apparatus is to provide a motorcycle transport apparatus which does not use straps to secure a motorcycle.

Yet another object of the present is to provide a motorcycle transport apparatus which does not require a user to worry about straps coming loose when transporting a motorcycle on rough highways.

Another object of the motorcycle transport apparatus is to use the frame of the motorcycle for securing it during transport.

A further object of the present apparatus is to provide a motorcycle transport apparatus from which a motorcycle may be easily disengaged.

Yet another object of the present motorcycle transport apparatus is to provide for easy operation by an individual, without assistance.

Still another object of the present apparatus is to provide a motorcycle transport apparatus which requires less time to load and unload a motorcycle than previously required.

An added object of the motorcycle transport apparatus is to prevent a motorcycle from falling over during transport.

A further object of the motorcycle transport apparatus is to prevent a motorcycle from falling over when such motorcycle is released from the apparatus.

Further, an object of the motorcycle transport apparatus to secure a motorcycle without compressing the motorcycle's suspension.

Another object of the present motorcycle transport apparatus is to hold a motorcycle rigidly in place during transport with no movement in said motorcycle's suspension.

Yet another object of the present apparatus is to allow a user to use a standard wheel chock in conjunction with said apparatus.

Still another object of the motorcycle transport apparatus is to provide a universal fit for a wide variety of motorcycles.

These objects, together with additional objects, features, and advantages of the improved motorcycle transport apparatus, will be readily apparent to those of ordinary skill in the art upon reading the following detailed description of presently preferred, but nonetheless illustrative, embodiments of the improved motorcycle transport apparatus when taken in conjunction with the accompanying drawings.

In this respect, before explaining the current embodiments of the improved motorcycle transport apparatus in detail, it is to be understood that the apparatus is not limited in its application to the details of construction and arrangements of the components set forth in the following description or illustration. Those skilled in the art will appreciate that the concept of this disclosure may be readily utilized as a basis for the design of other structure, methods, and systems for carrying out the several purposes of the improved motorcycle transport apparatus. It is therefore important that the claims be regarded as including such equivalent constructions insofar as they do not depart from the spirit and scope of the apparatus. It is also to be understood that the phraseology and terminology employed herein are for purposes of description and should not be regarded as limiting.

BRIEF DESCRIPTION OF THE DRAWINGS

FIG. 3 is a side elevation view of an adjustable clamp bar with C-clamp.

FIG. 4 is a perspective view of the clamp assembly.

FIG. 5 is a perspective view of the end of the clamp assembly illustrating a threaded rod and handle.

FIG. 6 is a perspective view of FIG. 5, illustrating a threaded rod within an adjustable clamp bar.

DETAILED DESCRIPTION OF THE DRAWINGS

With reference now to the drawings, and in particular FIGS. 1 through 11 thereof, the principles and concepts of the present apparatus generally designated by the reference number 10 will be described.

Figure 1:
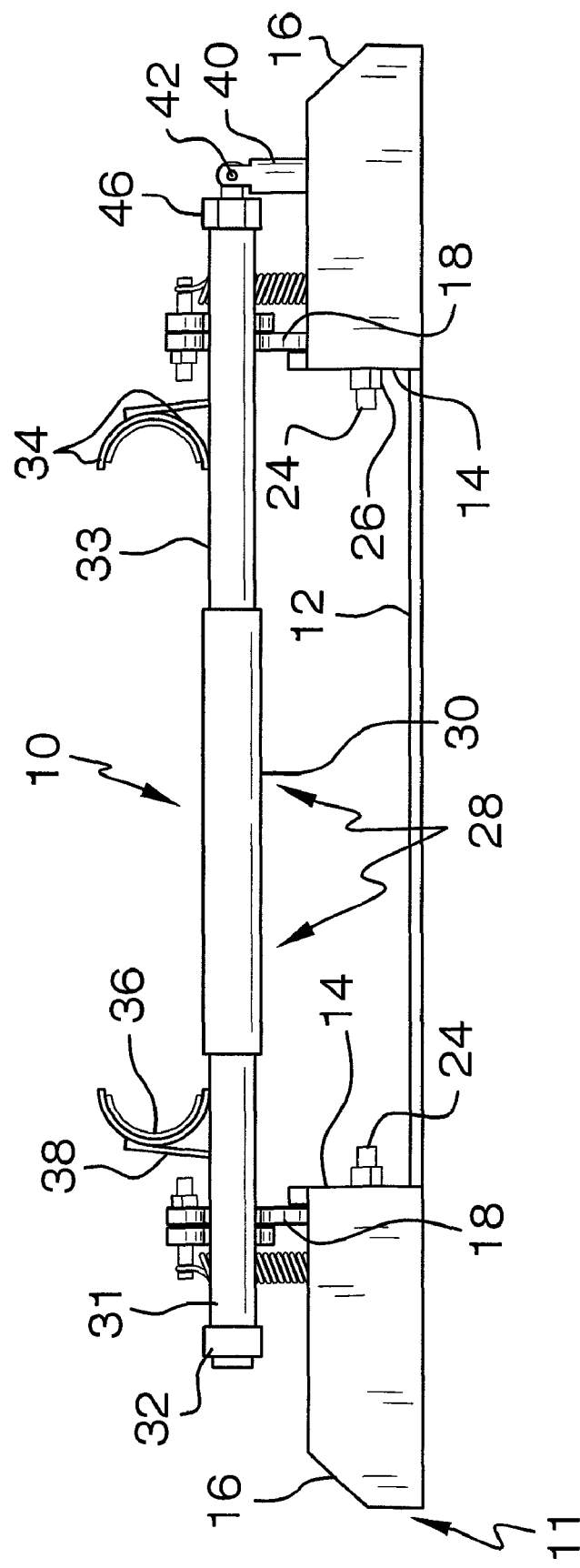
FIG. 1 is side elevation view of the present motorcycle transport apparatus.

Referring to FIG. 1, the apparatus 10 is comprised of a base assembly 11 and a clamp assembly 28. The clamp assembly 28 is removably mounted within the base assembly 11. The base assembly 11 is comprised of a base 12. The base 12 is a steel plate of rectangular shape. Said base 12 is powder coated. Spaced apart uprights 14 are affixed perpendicularly to the base 12. The vertically mounted uprights 14 are perpendicular to the length of base 12. The base 12 is about 28 inches long and about 6 inches wide. Uprights 14 are disposed approximately 5 inches from each end of the base 12. Uprights 14 are about 3 inches high. Each outer upper corner of each upright 14 is rounded. Upright braces 16 are affixed to the outer edges of the base 12. Upright braces 16 are affixed to the outer edges of the uprights 14. Upright braces 16 are coplanar to the length of the base 12. Each upright brace 16 is comprised of a brace slant 17 on the outer end of the upright brace 16. Each brace slant is about a 45-degree angle with respect to the ends and upper edge of the brace slant 17. A side plate 18 is attached to each upright 14. Side plates 18 are adjustably attached via bolts 24 and shoulder nuts 26. Said side plates 18 are powder coated. The clamp assembly 28 is comprised of the outer tube 30. Outer tube 30 is solidly affixed with the rigid clamp bar 31 on one end of outer tube 30.

Figure 2:
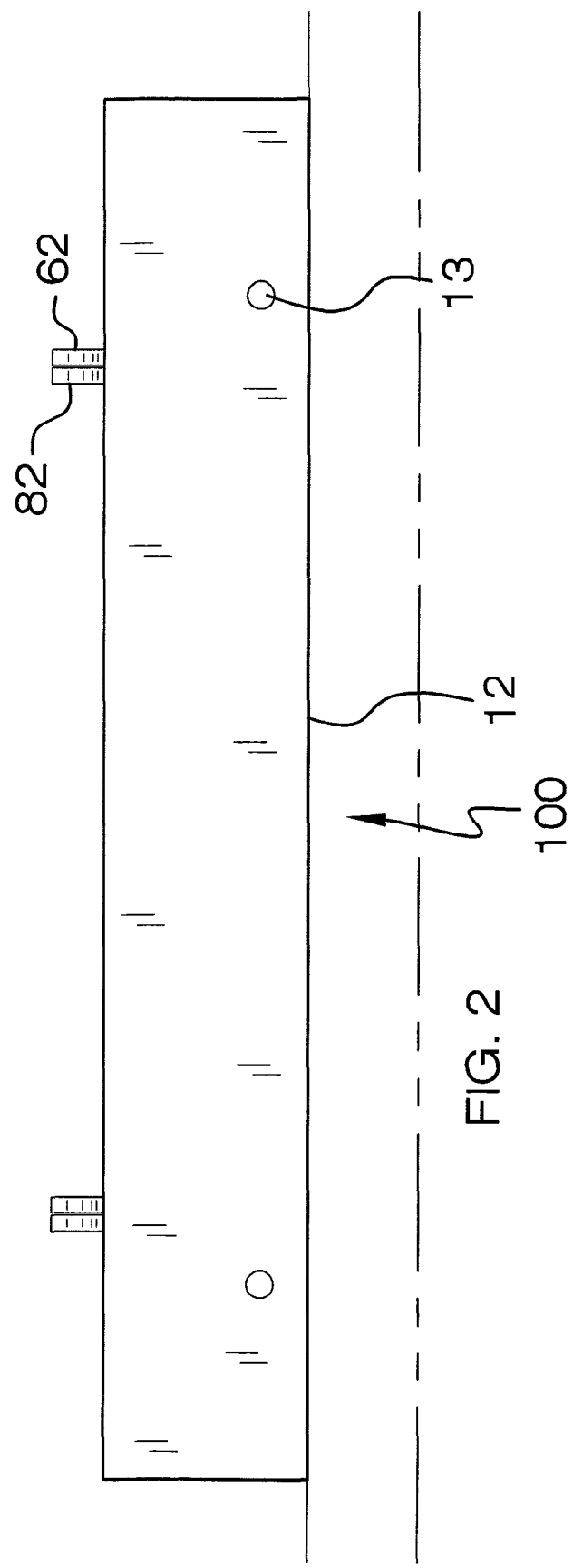
FIG. 2 is a bottom plan view.

Referring to FIG. 2, the base 12 is further comprised of mounting holes 13. Each mounting hole 13 is proximal to the end of the base 12. Mounting holes 13 are approximately centered between the outer sides of the base 12. Mounting holes 13 are provided for mounting the base 12 atop the truck bed 100. Mounting holes 13 are further provided for mounting the base 12 to any other surface (not shown).

Referring to FIG. 3, the clamp assembly is partially comprised of a pair of spaced apart C-clamps 34. The C-clamp is further comprised of a C-clamp interior. 35. The scallop formed by the C-clamp interior 34 is perpendicular to the cylindrical outer tube 30 and the adjustable clamp bar 33. The C-clamp 34 is braced by the clamp brace 38. The clamp brace 38 is attached to the back side of the C-clamp 34 and to the adjustable clamp bar 33. The C-clamp 34 is thereby rigidly attached and braced to the adjustable clamp bar 33. The C-clamp interior 35 is lined with the cushion 36. The cushion 36 may be comprised of rubber and bonded to the C-clamp interior 35. The adjustable clamp bar 33 slides within the outer tube 30.

Referring to FIG. 4, the clamp assembly is further comprised of the opposite spaced apart C-clamp 34. The opposite C-clamp 34 is a mirror image of the first C-clamp 34 that is attached to the adjustable clamp bar 33. The opposite C-clamp interior 35 is lined with cushion 36. The opposite C-clamp is rigidly mounted to the rigid clamp bar 31. The rigid clamp bar 31 is rigidly affixed to the outer tube 30. The outer tube 30 is of a greater diameter than the rigid clamp bar 31 and the adjustable clamp bar 33. The rigid clamp bar 31 is bounded at the outer end by the bar end 32.

Referring to FIGS. 5 and 6, the adjustable clamp bar 33 adjustably slides within the outer tube 30. The adjustable clamp bar 33 is free to slide within the outer tube 30 to a point wherein the C-clamp 34 is proximal to the outer end of the outer tube 30. The adjustable clamp bar 33 is free to slide about the threaded rod 45. Sliding of the adjustable clamp bar 33 is outwardly bounded by the jamb nut 46 of the threaded rod 45. The rigid clamp bar 31 disposed at the opposite end of the outer tube 30 is interiorly threaded. The interior threads (not shown) of the rigid clamp bar 31 receive the threaded rod 45. The handle attach 44 outwardly bounds the jamb nut 46. The handle 40 is pivotally mounted to the handle attach 44 by the pivot pin 42. The handle channel 41 provides for the handle 40 to pivot in excess of 180 degrees about the handle attach 44. Turning the threaded rod 45 by the handle 40 adjusts the adjustable clamp bar 33. When viewed from the handle end of the threaded rod 45, clockwise turning of the threaded rod 45 adjusts the jamb nut 46 inwardly. Inward adjustment of the jamb nut 46 forces the adjustable clamp bar 33 inward. Adjusting the adjustable clamp bar 33 inwardly forces the C-clamp 34 inwardly. The opposing C-clamps 34 compresses against the frame (not shown) of a typical motorcycle (not shown). The cushions 36 prevent any marring of the motorcycle frame. Turning the threaded rod 45 in a counterclockwise direction provides for the adjustable clamp bar 33 and hence the attached C-clamp 34 to be removed from the motorcycle frame. The clamp assembly 28 is thereby quickly attached or removed from a given motorcycle frame. The adjustable clamp bar 33 in FIG. 5 is free to slide about the threaded rod 45 and within the outer tube 30. The jamb nut 46 in FIG. 6 has restricted the outward movement of the adjustable clamp bar 33.

Figure 7:
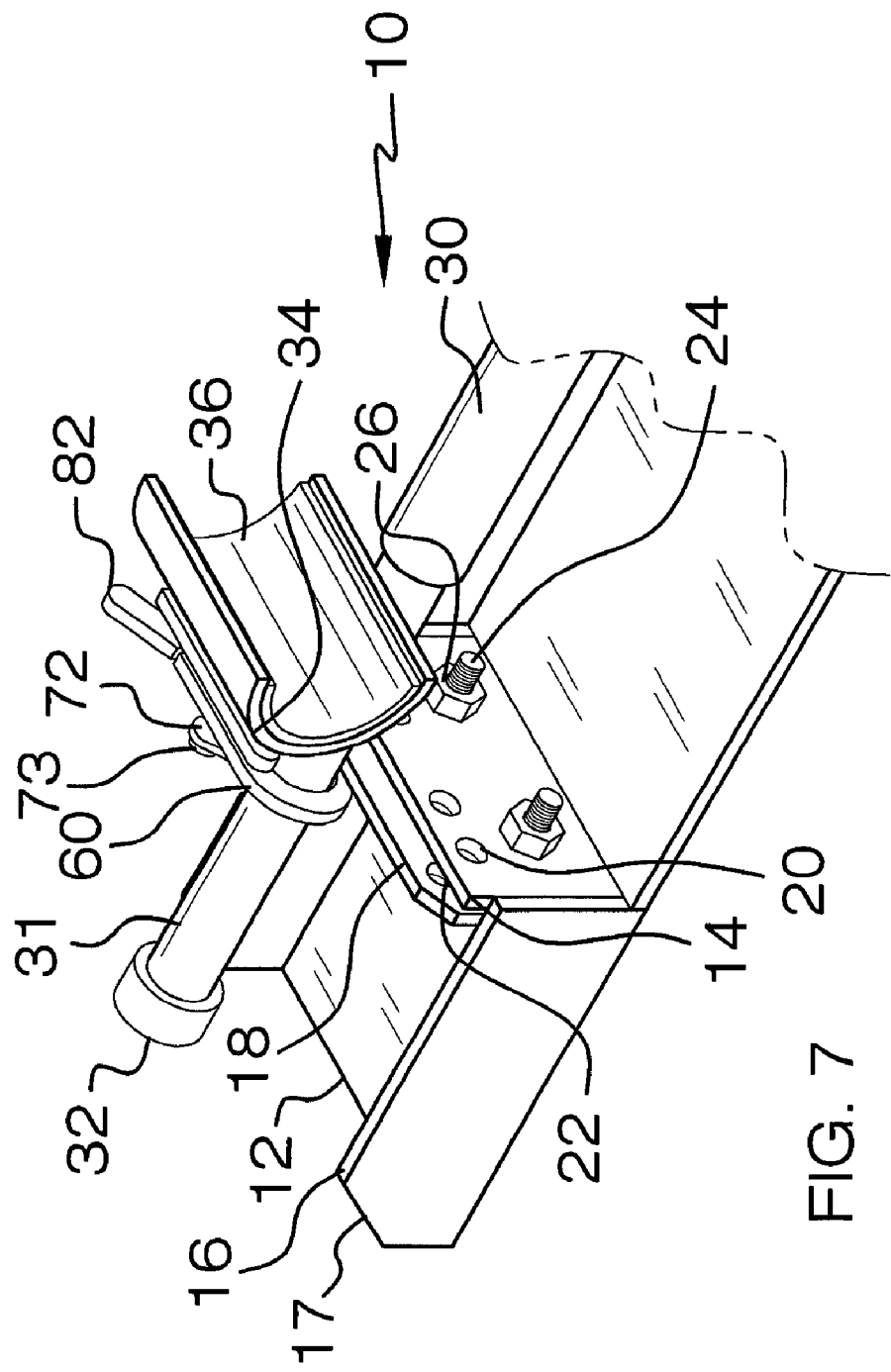
FIG. 7 is a front perspective view of the left side of a clamp assembly clamped within a base assembly.

Referring to FIG. 7, the upright 14 is rigidly affixed to the base 12. The upright 14 is perpendicular to the length of the base 12. The upright 14 is vertically attached to the base 12. The side plate 18 is removably attached to the upright 14. The side plate 18 is adjustable with respect to attachment to the upright 14. A plurality of upright adjustment holes 20 is provided. A plurality of plate adjustment holes 22 is provided within each side plate 18. Bolts 24 are inserted through the appropriate upright adjustment holes 20 and plate adjustment holes 22. Shoulder nuts 26 secure the bolts 24. The adjustment capabilities of the side plate 18 attachments are provided to suit various heights of motorcycle frames.

Figure 8:
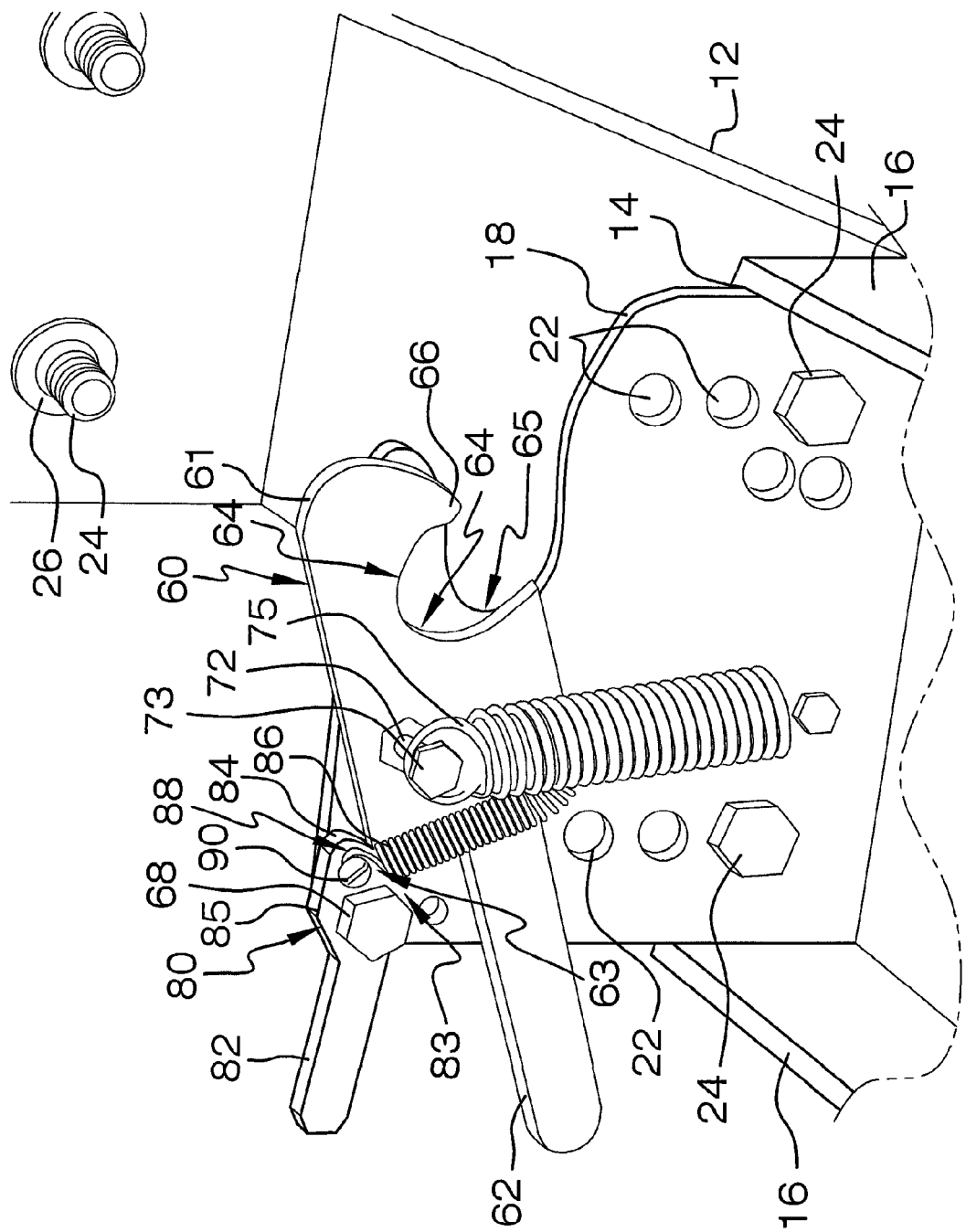
FIG. 8 is a left elevation view of a base assembly.
Figure 10:
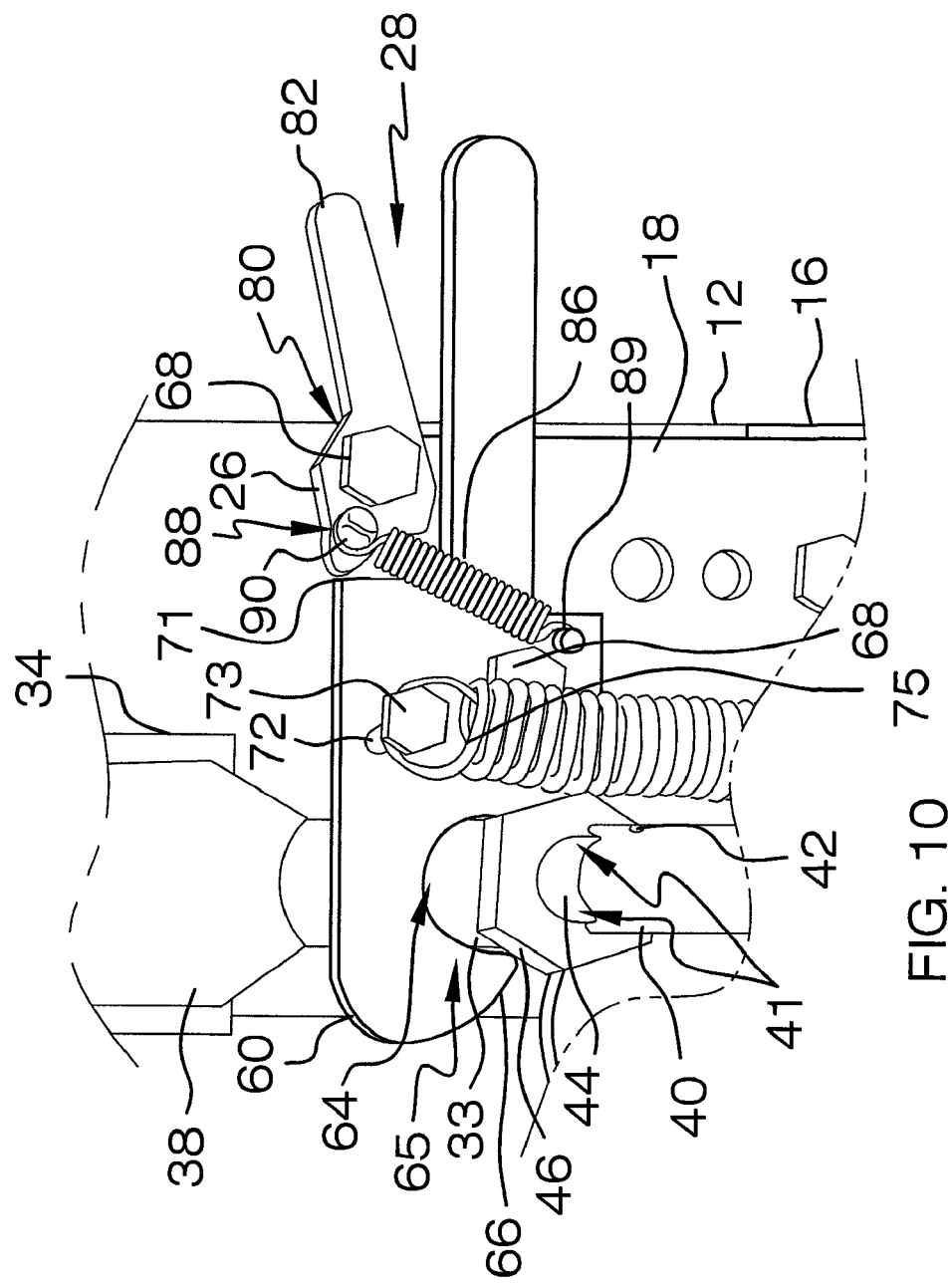
FIG. 10 is right elevation view of a base assembly mounted with a clamp assembly.

Referring to FIG. 8, the side plate 18 is attached to the upright 14 via bolts 24. The side plate 18 is attached at lower plate adjustment holes 22. The side plate 18 is further comprised of the pivotally attached latch lever 60. Latch lever 60 is comprised of a lever channel 64. The lever channel 64 removably receives the rigid clamp bar 31 (FIGS. 1, 4 and 7). The lever channel 64 is further comprised of the channel ear 66. The channel ear 66 assists in firmly locking the rigid clamp bar 31 within the lever channel 64. The plate slot 65 of the side plate 18 removably guides and receives the rigid clamp bar 31. The side plate 18 is further comprised of a lower latch spring anchor 74. The lower latch spring anchor 74 is outwardly bounded by the latch spring stop 73. The latch lever 60 is pivotally mounted to the outside of the side plate 18. The latch lever 60 is pivotally mounted via the pivot bolt 68 (FIG. 10). The latch lever 60 is free to pivot about the pivot bolt 68.

Figure 9:
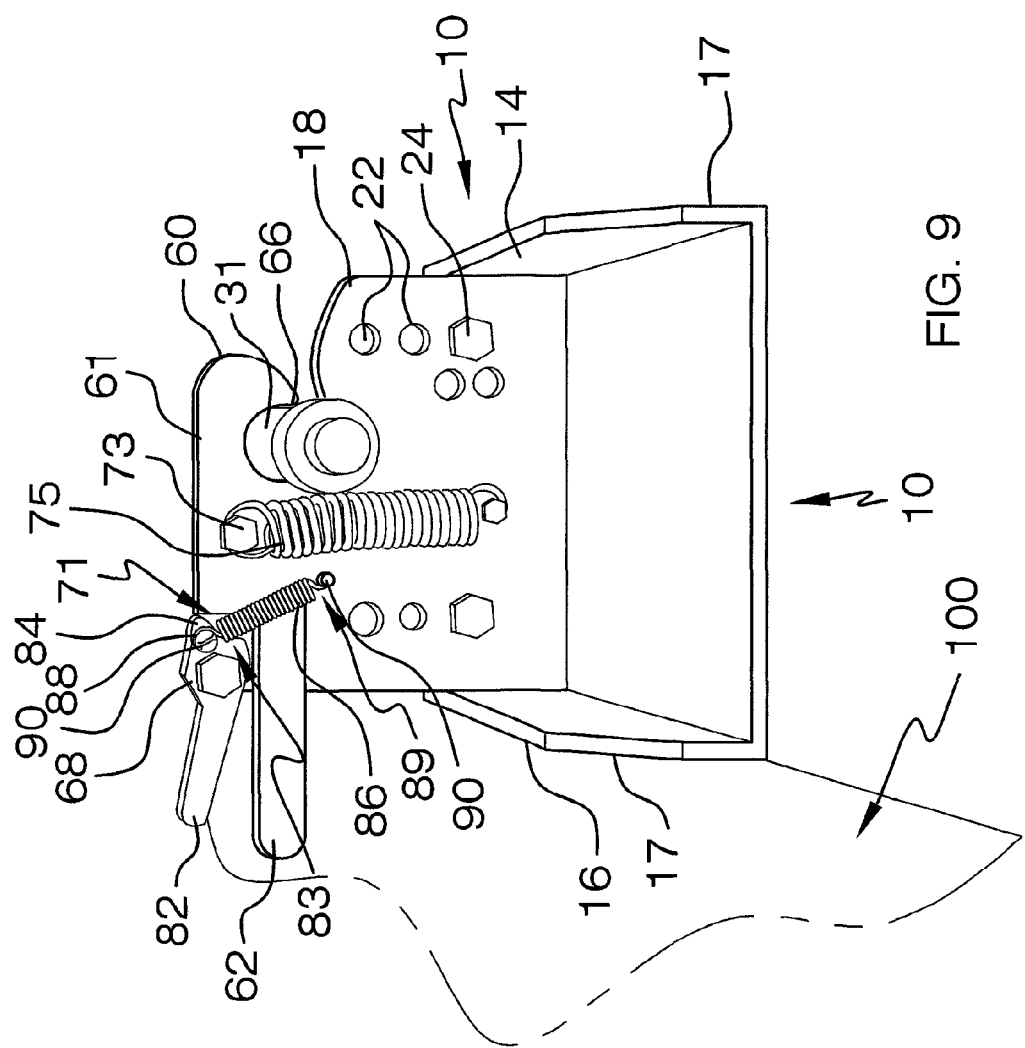
FIG. 9 is a left elevation view of a base assembly mounted with a clamp assembly mounted.

The latch lever 60 further comprises an upper latch spring anchor 72. The latch spring 75 is an extension spring 75 and is formed of stainless steel. The latch spring 75 pulls the latch lever 60 to a return position as allowed by the lock lever 80. The return position of the latch lever 60 positions the latch lever arm 62 in a horizontal plane (FIG. 9). The return position of the latch lever 60 closes the lever channel 64 and channel ear 66 about the rigid clamp bar 31 (FIG. 9). The lock lever 80 is pivotally mounted to the side plate 18 at an upper and outer corner of the side plate 18. The lock lever 80 is pivotally mounted via the pivot bolt 68. The lock lever 80 is free to pivot about the pivot bolt 68. The latch lever 60 is pivoted to the open position. The lever shoulder 84 of the lock lever 80 is positioned above and rests upon the latch lever horizontal 61. The latch lever corner 63 temporarily resides within the space of the lock lever notch 83. In arriving at this position of the latch lever 60 and the lock lever 80, the lock lever arm 82 has been moved downwardly. The downward movement of the lock lever arm 82 is resisted by the lock spring 86. The downward movement of the lock lever arm 82 allows for the downward movement of the latch lever arm 62. The downward movement of the lock lever arm 82 provides for the latch lever corner 63 to move within the lock lever notch 83

Referring to FIG. 9, the latch lever 60 is in the closed position. The latch lever channel 64 and the channel ear 66 are locked in position around the rigid clamp bar 31. The latch lever horizontal 61 is positioned level in the horizontal plane. The latch spring 75 aids in retaining the latch lever 60 in this position. The lock lever shoulder 84 is abutted against the latch step 71. The lock lever 80 is held as positioned by the lock spring 86. The lock spring 86 is hooked around the lower lock spring anchor 89 at the lower end of the lock spring 86. The upper end of the lock spring 86 is hooked around the upper lock spring anchor 88. The spring is retained on the upper lock spring anchor 88 and the lower lock spring anchor 89 by the lock spring stops 90.

Referring to FIG. 10, the opposite end of the base assembly 11 and clamp assembly 28 illustrates the locked engagement of the adjustable clamp bar 33 fitted within the plate slot 65 and the lever channel 64. The operation of the mirror image base assembly 11 and clamp assembly 28 is identical to the opposite end of the base assembly 11 and clamp assembly 28 of FIG. 9.

Figure 11:
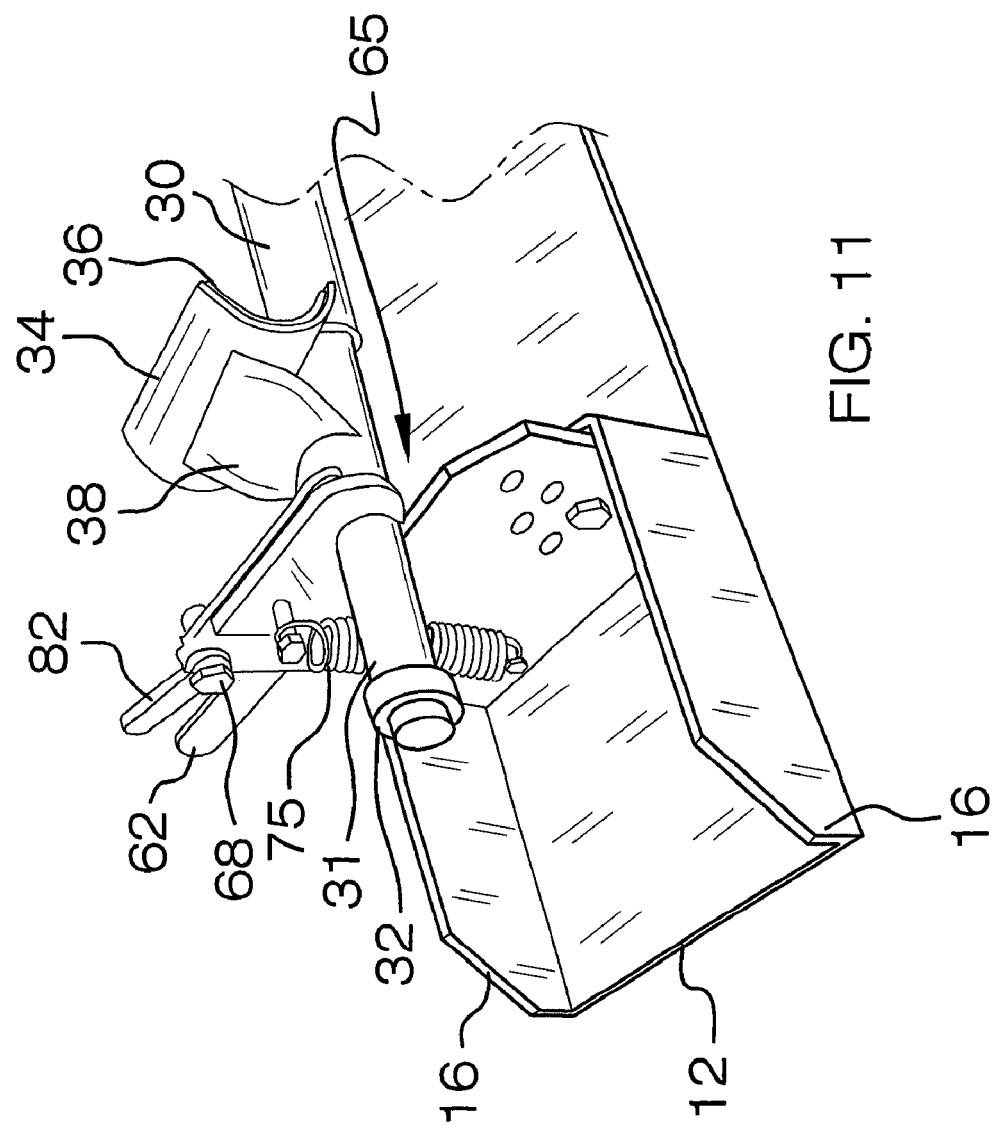
FIG. 11 is a right perspective view of the base assembly mounted with a clamp assembly.

Referring to FIG. 11, the latch spring 75 secures the latch lever 60 around the rigid clamp bar 31. The lock lever 80 retains the latch lever 60 in the desired position.

Stainless steel bushing are used in all component latches and locks in the present apparatus. All springs are also stainless steel.

Operation:

In use, a clamp assembly 28 of the apparatus 10 may be adjusted to fit to the front, middle or rear of various motorcycle frames.

To mount a base 12, a user positions said base 12 as desired in a truck bed 100, for example. Generally, said base 12 should be centered from the sides of said truck bed 100. Mounting holes 13 are used to mark spots for drilling the truck bed 100 or other mounting surface. Bolts are used to mount said base 12 to a mounting surface, such as a truck bed 100.

To secure a motorcycle using the present motorcycle transport apparatus, plate slots 65 are positioned to open to the rear of said mounting surface. A lock lever arm 82 is pushed downwardly. The downward movement of said lock lever arm 82 provides for the downward movement of a latch lever arm 62. A lock lever 80 is released. A lock lever notch 83 thereby receives a latch lever corner 63 to retain a latch lever channel 64 in an open position. A clamp assembly 28 is tightened about a motorcycle frame. Such motorcycle is then moved toward a base assembly 11 so that a rigid clamp bar 31 and an adjustable clamp bar 33 are within said plate slots 65. If said adjustable clamp bar 33 will not clear a ramp in order to drive a motorcycle onto a truck bed 100 or trailer bed, then a user must install said adjustable clamp bar 33 onto the motorcycle frame after entering the truck bed 100 or trailer bed. Each lock lever arm 82 is pushed downwardly with each of a rider's feet. The downward movement of said lock lever arm 82 allows for the release and upward movement of said latch lever arm 62. Upward movement of said latch lever arms 62 allow said lever channels 64 and channel ears 66 to lock around said respective rigid clamp bar 31 and adjustable clamp bar 33. Such motorcycle is then fully secured with springs locking the base assembly 11 and clamp assembly 28 firmly together.

For Dyna model motorcycles, said clamp assembly 28 is adjusted so that the forward part of a motorcycle frame is secured to a base assembly 11 so as to not interfere with raising a kickstand.

For softail motorcycle models, said clamp assembly 28 is adjusted to that the motorcycle is secured at the rear of a frame to allow a kickstand to be raised; provided, however, that the brake line must be moved slightly to allow for proper placement.

For FLH and FLT motorcycle models, said clamp assembly 28 is adjusted so that a motorcycle is secured to a base assembly 11 at the back of the center of the motorcycle frame; provided, however, that a user must pick up the kickstand with the user's hand and place said kickstand on top of said adjustable clamp bar 33.

For V-Rod motorcycle models, said clamp assembly 28 is adjusted so that a motorcycle is secured to a base assembly 11 at the rear of said motorcycle's frame over the allen screw which bolts the frame together. A user should then raise the kickstand.

For custom-made motorcycles, if a frame tube is too low for the motorcycle's base height, a piece of wood can be mounted to the truck bed 100 or trailer floor to raise the rear wheel of the motorcycle to proper height for mounting to the base assembly 11.

Release of a clamp assembly 28 from a base assembly 11 is accomplished by reverse procedure. The downward movement of the lock lever arm 82 with each foot of a user allows the release of a latch lever 60. A latch lever arm 62 is pushed downwardly. A lock lever 80 is released. Said lock lever 80 thereby secures a latch lever 60 in an open position, allowing a motorcycle to be removed. When a user pushes his foot on each latch, the motorcycle will move back about ¼". If the truck or trailer is on a hill or incline, the motorcycle could potentially roll from the base and fall. To present this from occurring, a rider should engage the motorcycle transmission into low gear, allowing the motorcycle to roll back enough to unlatch the locks. After releasing the latches, a rider must hold the hand brakes while getting onto the motorcycle so that the motorcycle does not roll from the base. The base will hold the motorcycle upright until it is moved back another inch. Then the motorcycle is backed off of the truck bed or trailer bed, the rider lowers the kickstand, and removes the adjustable clamp bar from the motorcycle. Said clamp assembly 28 is removed from such motorcycle by turning a handle 40 in a counterclockwise motion. The motorcycle is then ready to ride.

With respect to the above description then, it is to be realized that the optimum dimensional relationships for the parts of the motorcycle transport apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present apparatus.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present apparatus may be used.

Therefore, the foregoing is considered as illustrative only of the principles of the apparatus. Further, since numerous modifications and changes will readily occur to those skilled in the art, it is not desired to limit the apparatus to the exact construction and operation shown and described, and accordingly, all suitable modifications and equivalents may be resorted to, falling within the scope of the apparatus.

What is claimed is:

1. A motorcycle transport apparatus comprising:
a parallelepiped base assembly;
an attachment means for attaching the base assembly to a surface;
an adjustable clamp assembly, the clamp assembly removably clamping to a lower frame of the motorcycle;
means for removably securing the clamp assembly to the base assembly;
wherein the clamp assembly is cushioned at any points of contact with the motorcycle frame,
wherein the means for removably securing the clamp assembly to the base assembly comprises a spring tensioned latch lever.

2. A motorcycle transport apparatus comprising:
a parallelepiped base assembly;
an attachment means for attaching the base assembly to a surface;
an adjustable clamp assembly, the clamp assembly removably clamping to a lower frame of the motorcycle, the clamp assembly comprising:
  an outer tube having a first end and a second end;
  a female thread within the outer tube;
  a threaded rod fitted within the outer tube, the threaded rod having a first end, a second end, and a length therebetween, the second end of the threaded rod engaged with the outer tube female thread;
  a jamb proximal to the first end of the threaded rod;
  a means for turning the threaded rod;
  a clamp bar fitted within the outer tube; the clamp bar fitted around the threaded rod, the clamp bar slideably captured between the female thread of the outer tube and the jamb of the threaded rod;
  a C-clamp disposed on an exterior of the clamp bar,
wherein turning the threaded rod into the outer tube reduces a distance between the C-clamp and the outer tube, thereby removably clamping the clamp assembly to the motorcycle frame;
a means for removably securing the clamp assembly to the base assembly.

* * * * *